United States Patent [19]

Mori et al.

[11] Patent Number: 4,560,784

[45] Date of Patent: Dec. 24, 1985

[54] HEAT-RESISTANT ORGANOPOLYSILOXANE COMPOSITION

[75] Inventors: Shigeru Mori; Yasuo Tarumi, both of Gunma, Japan

[73] Assignee: Shin-Etsu Chemical Co., Ltd., Tokyo, Japan

[21] Appl. No.: 697,793

[22] Filed: Feb. 4, 1985

[30] Foreign Application Priority Data

Feb. 6, 1984 [JP] Japan .................. 59-19773

[51] Int. Cl.[4] .......................... C07F 7/08; C07F 7/10; C07F 7/18
[52] U.S. Cl. .................................... 556/401
[58] Field of Search ........................ 556/401

[56] References Cited

U.S. PATENT DOCUMENTS

| Re. 28,938 | 8/1976 | Koda et al. | 556/401 |
| 2,445,567 | 7/1948 | Elliott | 556/401 |
| 4,193,885 | 3/1980 | Halm | 556/401 X |

FOREIGN PATENT DOCUMENTS 53-65400  10/1978  Japan ........................... 556/401

Primary Examiner—Paul F. Shaver
Attorney, Agent, or Firm—Toren, McGeady, Stanger, Goldberg & Kiel

[57] ABSTRACT

The organopolysiloxane composition, e.g. silicone fluid, of the invention is imparted with high heat resistance by admixing with a specific heat-resistance improver which is prepared by a heat treatment of a mixture composed of (a) 100 parts by weight of an organopolysiloxane having a specified viscosity, (b) a carboxylate of cerium such as 2-ethylhexoate in an amount of 0.05 to 5 parts by weight as cerium and (c) an alkoxide compound of titanium or zirconium such as tetrabutyl titanate in an amount to give 0.1 to 5 times by weight of the titanium or zirconium element based on the cerium content in the component (b) at a temperature of, for example, 150° to 310° C. for 30 minutes to 10 hours.

5 Claims, No Drawings

HEAT-RESISTANT ORGANOPOLYSILOXANE COMPOSITION

BACKGROUND OF THE INVENTION

The present invention relates to a heat-resistant organopolysiloxane composition or, more particularly, to an organopolysiloxane fluid having improved heat-resistance.

As is known, one of the methods for the improvement of the thermal stability of an organopolysiloxane is the admixture of the organopolysiloxane with an inorganic compound of a metal such as iron, zirconium, cerium, manganese and the like. It is also known that cerium compounds are the most preferable among the inorganic compounds of the above mentioned metal compounds in respect of the excellent thermal stability of the organopolysiloxane admixed therewith and no or little coloration of the organopolysiloxane thereby. Suitable forms of the cerium compounds include the oxide, hydroxide and salts with aromatic carboxylic acids (see, for example, Japanese Patent Publications Nos. 43-16304 and 36-6189). A problem in the admixture of these cerium compounds with organopolysiloxanes in general is the low solubility of the cerium compound in the siloxane so that the cerium compound can hardly be introduced into the organopolysiloxane with sufficient uniformity and the improvement of the thermal stability obtained thereby is not sufficiently high as a consequence.

Accordingly, various attempts and proposals have been made in connection with the method for uniformly introducing a cerium compound into an organopolysiloxane though with their own respective disadvantages and problems. For example, a chelate compound of cerium is reacted with an organopolysiloxane having hydrogen atoms directly bonded to the silicon atoms and the reaction product is added to an organopolysiloxane (see U.S. Pat. No. 3,008,901). A problem in this method is the difficulty to ensure complete absence of the hydrogen atoms directly bonded to the silicon atoms which are detrimental to the thermal stability of the organopolysiloxane. In another method, a silicone fluid containing acetylacetonato complex of cerium dissolved therein is added dropwise into another silicone fluid heated at 200° to 300° C. while air is blown thereinto (see Japanese Patent Kokai No. 53-65400). This method is disadvantageous due to the expensiveness of the cerium complex in addition to the limited solubility thereof in silicone fluids which consequently necessitates an increased amount of addition into the silicone fluid. Further, the dropwise addition of the silicone fluid containing the cerium complex must be carrried out with utmost care in order to avoid precipitation of the cerium complex taking a long time so that the process is complicated. Further, a method is proposed in which a cerium salt of a carboxylic acid is reacted with an alkali metal silanolate and the reaction product is added to an organopolysiloxane together with an alkoxide or carboxylate of zirconium, titanium, iron and the like metal (see Japanese Patent Publication No. 53-12541). A problem in this method is that, while the reaction product of the cerium salt and the alkali silanolate must be neutralized before introduction into the organopolysiloxane, difficulties are encountered in achieving an exact neutrality always leaving a trace amount of an acidic or alkaline ionic impurity which is very detrimental to the thermal stability of organopolysiloxanes so that the desired imporvement in the thermal stability of an organopolysiloxane can not always be obtained.

SUMMARY OF THE INVENTION

It is therefore an object of the present invention to provide a novel organopolysiloxane composition having excellent heat resistance without the problems in the prior art compositions described above.

Thus, the heat-resistant organopolysiloxane composition provided by the invention comprises:
(A) 100 parts by weight of an organopolysiloxane; and
(B) from 0.1 to 10 parts by weight of a reaction product obtained by subjecting a mixture comprising
  (a) 100 parts by weight of an organopolysiloxane having a viscosity in the range from 10 to 10,000 centistokes at 25° C.,
  (b) a cerium carboxylate represented by the general formula $(R^1COO)_nCe$, in which $R^1$ is a monovalent hyrocarbon group and the suffix n is 3 or 4, in such an amount that from 0.5 to 5 parts by weight of the element of cerium are provided, and
  (c) an alkoxide compound of titanium or zirconium represented by the general formula $(R^2O)_4M$, in which $R^2$ is a monovalent hydrocarbon group and M is an atom of titanium or zirconium, or a hydrolysis product thereof in an amount to provide the element of titanium or zirconium in the range from 0.1 to 5 times of the amount of cerium in the component (b), to a heat treatment at a temperature of 150° C. or higher.

In particular, the component (b) may not be a compound of pure cerium but it can be a mixture of corresponding compounds of mixed rare earth elements of which cerium is the main component element provided that the amount of the cerium element is within the above defined range.

DETAILED DESCRIPTION OF THE PREFERRED EMBODIMENTS

The most characteristic feature of the above described heat-resistant organopolysiloxane composition is the admixture of the component (B) as a heat-resistance improver of an organopolysiloxane or an organopolysiloxane composition including ordinary silicone fluids, silicone greases and oil compounds mainly composed of a silicone fluid, silicone rubber compounds and the like. This component (B) can readily be prepared by subjecting a mixture composed of a relatively inexpensive carboxylate of cerium and an alkoxide of titanium or zirconium or a partial hydrolysis product thereof added to an organopolysiloxane having a specified viscosity to a heat treatment at a temperature of 150° C. or higher so as to give an organopolysiloxane composition containing cerium in good uniformity.

The principal constituent of the inventive orpagnopolysiloxane composition, i.e the component (A), is an organopolysiloxane without particular limitation. It can be any of known organopolysiloxanes having a linear or branched molecular configuration although it is preferably a diorganopolysiloxane mainly or wholly composed of diorganosiloxane units and having fluidity at room temperature. The organic groups bonded to the silicon atoms of this organopolysiloxane are selected from monovalent hydrocarbon groups including alkyl groups such as methyl, ethyl, propyl and butyl groups, alkenyl groups such as vinyl and allyl groups, aryl groups such as phenyl and tolyl groups and cycloalkyl groups such as cyclohexyl groups as well as those substituted hydrocarbon groups obtained by the replacement of a part or all of the hydrogen atoms in the above named hydrocarbon groups with substituent atoms or groups such as halogen atoms, cyano groups and the like exemplified, for example, by chloromethyl, fluoropropyl and cyanomethyl groups. The terminal groups at the molecular chain ends of the organopolysiloxane are each a trialkylsiloxy group, e.g. trimethylsiloxy group, but it is optional to replace one or more of the alkyl groups with hydroxy groups, vinyl groups, alkoxy groups and the like. The component (A) may of course be a mixture of two kinds or more of organopolysiloxanes of different types.

The component (B) in the inventive heat-resistant organopolysiloxane composition is a reaction product in the heat treatment of a mixture composed of the components (a), (b) and (c). The component (a) is an organopolysiloxane which may be a similar one to the above described component (A). It is preferable, however, that the organopolysiloxane as the component (a) should have a viscosity in the range from 10 to 10,000 centistokes or, more preferably, from 50 to 1000 centistokes at 25° C. because an organopolysiloxane as the component (a) having a viscosity smaller than 10 centistokes at 25° C. may adversely affect the physical properties of the resultant organopolysiloxane composition as a result of the relatively high vaporizability of such a low-viscosity organopolysiloxane at an elevated temperature while an organopolysiloxane as the component (a) having an excessively high viscosity has a poor miscibility with the cerium compound described below so that the improvement in the heat resistance of the resultant organopolysiloxane composition would be insufficient.

The component (b) for the preparation of the component (B) is a cerium compound or carboxylate represented by the general formula $(R^1COO)_nCe$, in which $R^1$ is a monovalent hydrocarbon group. The suffix n is 3 or 4 so that both of the tervalent and tetravalent cerium compounds cane be used equally. Preferable examples of the cerium carboxylates include 2-ethylhexoate, naphthenate, oleate, laurate and stearate of cerium. The cerium compound may not be a compound of pure cerium but a mixture of the corresponding compounds of mixed rare earth elements can be used in such an amount that the content of the cerium compound is in the specified range. For example, a mixed rare earth product obtained from natural monazite mineral can be used as such without enrichment of the cerium content. In view of the easiness in handling and miscibility with the titanium or zirconium compound as the component (c) described below, it is convenient that the above described cerium carboxylate is dissolved in an organic solvent and the organic solution is used in the preparation of the component (B) by the heat treatment. Usable organic solvents are exemplified by petroleum solvents such as mineral spirit, ligroin, petroleum ether and the like and aromatic hydrocarbon solvents such as toluene, xylene and the like.

The component (c) used in the preparation of the component (B) is a compound of titanium or zirconium represented by the general formula $(R^2O)_4M$, in which M is an atom of titanium or zirconium and $R^2$ is a monovalent hydrocarbon group. The hydrocarbon group denoted by $R^2$ is preferably an alkyl group selected from the class consisting of isopropyl, n-butyl, stearyl and octyl groups. Thus, the compound of titanium or zirconium is a titanium tetraalkoxide or zirconium tetraalkoxide. The component (c) may be a partial hydrolysis product of the alkoxide compound.

The component (B) can readily be prepared by the heat treatment of a mixture of the above described components (a), (b) and (c) in a non-oxidizing atmosphere. The temperature of the heat treatment should be 150° C. or higher or, preferably, in the range from 150° to 310° C. or, more preferably, in the range from 200° to 310° C. When the temperature of the heat treatment is lower than 150° C., no uniformity can be obtained in the resultant reaction product while a temperature higher than 310° C. is undesirable due to the increased velocity of thermal decomposition of the organopolysiloxane as the component (a).

Although the component (B) can be prepared by subjecting a mixture of the components (a), (b) and (c) to a heat treatment as described above, it is preferable that the components (b) and (c) are first mixed together uniformly and the mixture is then blended with the component (a) since the cerium carboxylate as the component (b) sometimes forms a gel-like mass which can be dissolved in the component (a) with some difficulties. In this way for the preparation of the component (B), possible formation of a gel-like mass of the component (b) with less solubility can be avoided to some extent by virtue of dilution with the component (c).

In connection with the mixing ratio of the components (a), (b) and (c) in the mixture subjected to the heat treatment for the preparation of the component (B), the amount of the cerium carboxylate as the component (b) should be in such a range that the amount calculated as cerium is in the range from 0.05 to 5 parts by weight per 100 parts by weight of the component (a). When the amount is smaller than above, the resultant reaction product as the component (B) may have no sufficiently high activity for the improvement of the heat resistance of the organopolysiloxane composition admixed therewith. When the amount of the cerium compound is too large, on the other hand, a part of the cerium compound may remain undissolved in the organopolysiloxane as the component (a) so that the resultant component (B) would be inhomogeneous.

The titanium or zirconium compound as the component (c) has no activity in itself as a heat-resistance improver of organopolysiloxanes but it serves as a solubilization aid for the cerium compound as the componenet (b). Therefore, the amount of the component (c) should be determined relative to the amount of the component (b) and the amount should preferably be in the range from 0.05 to 5 times by weight or, more preferably, from 0.1 to 5 times by weight of the component (b), the amounts of the components (b) and (c) being calculated for the elements of cerium and titanium or zirconium, respectively. When the amount of the component (c) is smaller than the above specified range, difficulties are encountered in the uniform introduction of the component (b) into the organopolysiloxane due to the deficiency of the solubilization aid. When the amount of the component (c) is in excess of the above specified range, on the other hand, the excessive portion of the component (c) has no contribution as the solubilization aid for the component (b). The heat treatment of the mixture composed of the above described components (a), (b) and (c) should preferably be performed in a non-oxidizing atmosphere formed of an inert gas in order to prevent degradation of the organopolysiloxane as the component (a) by oxidation. The heat treatment may be performed either under normal pressure or under reduced pressure and the treatment is usually complete within 30 minutes to 10 hours when undertaken under normal pressure.

When the component (b) is used and mixed with the other components in the form of an organic solution, as is mentioned above, the solvent and other volatile matter are distilled out of the mixture in the early stage of the heat treatment and should be removed from the mixture as completely as possible finally to leave no trace of such volatile matters.

The component (B) prepared in the above described manner is stable and storable over a long period of time when it is kept in a hermetically sealed container but otherwise the titanium or zirconium compound contained therein may be hydrolyzed during storage and the hydrolysis product precipitates in the component (B).

The heat-resistant organopolysiloxane composition of the present invention can be prepared by uniformly mixing the above described components (A) and (B). It is preferable that the component (B) is prepared in advance and a desired amount thereof is added and blended with the component (A). It is, however, optional that the component (A) is first admixed with a calculated amount of the component (a) for the preparation of the component (B) followed by the addition of the components (b) and (c) and heating of the mixture at a temperature of 150° C. or higher to effect in situ formation of the component (B) in the component (A).

The heat-resistant organopolysiloxane composition prepared in the above described manner is usually a yellowish brown fluid containing 0.00005 to 0.5% by weight of cerium. When further improvement in the heat resistance and decrease of coloration of the composition are desired, it is preferable that the composition is subjected to a heat treatment at a temperature in the range from 200° to 310° C. while air or oxygen gas is continuously introduced thereinto. This heat treatment can of course be performed after a desired amount of the component (B) has been added to the component (A) but it is a preferable way that the component (A) with admixture of a part of the component (B) is first subjected to a preliminary heat treatment at a temperature in the range from 150° to 200° C. for 1 to 4 hours followed by the admixture of the remainder of the component (B) and heat treatment of the final mixture at 200° to 310° C. for 1 to 10 hours. The heat-resistant organopolysiloxane composition can be used usually as such but it is sometimes preferable to filtrate the composition as prepared after completion of the heat treatment. When even a trace amount of volatile matters is undesirable, in particular, such volatile matters should be stripped away prior to use of the composition by heating under a reduced pressure.

The organopolysiloxane composition of the present invention can be a silicone fluid or a silicone rubber composition having remarkably improved heat resistance according to the type of the component (A) which may be a silicone fluid or a silicone rubber composition, respectively. Therefore, the subject material of the present invention is not limited to a particular type of the silicone products so that the present invention is very advantageous in the versatility of the silicone products to which the principle of the invention is applicable.

In the following, the heat-resistant organopolysiloxane composition of the present invention is described in more detail by way of examples, in which the expression of "parts" always refers to "parts by weight" and the values of viscosity are all the values obtained by the measurement at 25° C.

EXAMPLE 1

A 2-ethylhexoate of mixed rare earth elements derived from monazite mineral and containing 48% by weight of the cerium compound was dissolved in terpene in a concentration of 6% by weight as the rare earth elements and 100 parts of a dimetylpolysiloxane fluid having a viscosity of 100 centistokes were admixed with a mixture composed of 10 parts of the above prepared terpene solution and 2.1 parts of tetra(n-butyl) titanate under vigorous agitation to give a yellowish white dispersion. This dispersion was heated to distil out the terpene under a gentle stream of nitrogen gas and then further heated at 300° C. for 1 hour to give a nearly clear, dark redheated dish brown fluid composition, which is referred to as Composition I hereinbelow.

Thereafter, 100 parts of the same dimethylpolysiloxane fluid as used in the preparation of the Composition I were heated at 200° C. and admixed with 10.8 parts of the Composition I while air was blown thereinto followed by temperature elevation up to 250° C. where the mixture was kept for 1 hour and then admixed with additional 0.8 part of the Composition I. The temperature of the mixture was further increased to 300° C. and the mixture was kept at this temperature for 1 hour followed by cooling by standing and filtrated to give a clear, light yellow silicone fluid, which is referred to as Fluid I hereinbelow.

For comparison, Composition II was prepared in the following manner. Thus, a mixture of 40 parts of a dimethylpolysiloxane having a viscosity of 30 centistokes, 20 parts of potassium silanolate synthesized from octamethyl cyclotetrasiloxane and potassium hydroxide and 0.2 part of hexamethyl phosphoramide was heated at 110° C. for 2 hours in an atmosphere of nitrogen, to which 80 parts of dry xylene and 10 parts of cerium 2-ethylhexoate were added. After 2.5 hours of heating under reflux of the solvent, the mixture was admixed with 2 parts of trichlorosilane and, after removal of the solvent by distillation under reduced pressure, filtrated to give a light yellow liquid which was further admixed with 1% by weight of tetrabutyl titanate to give a mixture called Composition II.

Fluid II was prepared by admixing 100 parts of a dimethylpolysiloxane fluid having a viscosity of 100 centistokes with 2 parts of the Composition II.

The heat resistance of the above prepared Fluids I and II was examined in the following manner. Thus, each 25 g of the Fluids were taken in a glass beaker of 100 ml capacity and kept in a hot air oven of air-circulation type controlled at 200° C. for 360 hours or at 300° C. for 100 hours to determine the viscosity increase in % and weight loss in %. The results were as shown in Table 1 below, from which it is clear that the heat resistance of the Fluid I according to the present invention is much better than the comparative Fluid II.

TABLE 1

| Conditions of heat treatment | Fluid I | | Fluid II | |
|---|---|---|---|---|
| | Viscosity increase, % | Weight loss, % | Viscosity increase, % | Weight loss, % |
| 360 hours at | 11.9 | 4.4 | 35.8 | 6.3 |

TABLE 1-continued

| Conditions of heat treatment | Fluid I Viscosity increase, % | Fluid I Weight loss, % | Fluid II Viscosity increase, % | Fluid II Weight loss, % |
|---|---|---|---|---|
| 200° C. 100 hours at 300° C. | 21.9 | 19.1 | (gelled) | |

EXAMPLE 2

A clear, light yellow silicone fluid, referred to as Fluid III, was prepared by mixing 100 parts of a dimethylpolysiloxane having a viscosity of 50 centistokes and 1.6 parts of the Composition I prepared in the preceding Example followed by the same treatment as in the same Example.

For comparison, 100 parts of the same dimethylpolysiloxane as used above were admixed with acetylacetonato complex of cerium (III) and heated at 75° C. for 1 hour with air blowing thereinto under agitation to give an orange liquid having turbidity, which is referred to as Fluid IV hereinbelow. Thereafter, 100 parts of this Fluid IV were added dropwise over a period of 2 hours into 100 parts of the same dimethylpolysiloxane as above heated at 270° C. with air blowing thereinto under agitation and the mixture was further heated at 270° C. for 3 hours followed by cooling by standing and filtration to give a clear, light yellow silicone fluid, which is referred to as Fluid V hereinbelow.

Each of the Fluids III and V was subjected to the test of the heat resistance in the same manner as in Example 1 at 300° C. After 500 hours of heating at this temperature, the Fluid III indicated 41.9% of the viscosity increase while the Fluid V was found to have been completely gelled.

EXAMPLE 3

A dimethylpolysiloxane fluid containing 0.04% by weight of cerium and 1.2% by weight of zirconium was prepared by adding 5.6 g of a toluene solution of 2-ethylhexoate of cerium as a rare earth mixture and containing 7.1% by weight of cerium and 50.5 g of tetrabutyl zirconium to 1000 g of a dimethylpolysiloxane fluid having a viscosity of 50 centistokes followed by heating of the mixture at 250° C. in an atmosphere of an inert gas under a pressure of 10 mmHg to remove the solvent.

The above prepared cerium- and zirconium-containing fluid was added to a dimethylpolysiloxane fluid having a viscosity of 100 centistokes in such an amount that the content of cerium therein was 100 p.p.m. by weight and the dimethylpolysiloxane fluid was subjected to the test of viscosity increase by heating at 300° C. in an open condition and in a hermetically sealed condition. When heated in an open condition, the fluid was gelled after 179 hours of heating while the fluid heated in a hermetically sealed condition indicated 3.2% of viscosity decrease after 200 hours of heating at 300° C.

What is claimed is:

1. A heat-resistant organopolysiloxane composition which comprises:
  (A) 100 parts by weight of a first organopolysiloxane; and
  (B) from 0.1 to 10 parts by weight of a reaction product obtained by subjecting a mixture comprising
    (a) 100 parts by weight of a second organopolysiloxane having a viscosity in the range from 10 to 10,000 centistokes at 25° C.,
    (b) a cerium carboxylate represented by the general formula $(R^1COO)_nCe$, in which $R^1$ is a monovalent hydrocarbon group and the suffix n is 3 or 4, in such an amount that from 0.5 to 5 parts by weight of cerium are provided, and
    (c) an alkoxide compound of titanium or zirconium represented by the general formula $(R^2O)_4M$, in which $R^2$ is a monovalent hydrocarbon group and M is an atom of titanium or zirconium, or a partial hydrolysis product thereof in an amount to provide the element of titanium or zirconium in an amount in the range from 0.1 to 5 times by weight of the amount of cerium in the component (b),
  to a heat treatment at a temperature of 150° C. or higher.

2. The heat-resistant organopolysiloxane composition as claimed in claim 1 wherein the second organopolysiloxane as the component (a) has a viscosity in the range from 50 to 1000 centistokes at 25° C.

3. The heat-resistant organopolysiloxane composition as claimed in claim 1 wherein the cerium carboxylate is selected from the class consisting of 2-ethylhexoate, naphthenate, oleate, stearate and laurate of cerium.

4. The heat-resistant organopolysiloxane composition as claimed in claim 1 wherein the monovalent hydrocarbon group denoted by $R^2$ is selected from the class consisting of isopropyl, n-butyl, stearyl and octyl groups.

5. The heat-resistant organopolysiloxane composition as claimed in claim 1 wherein the cerium carboxylate is added to the mixture composed of the components (a), (b) and (c) as a mixture of carboxylates of rare earth elements.

* * * * *